May 3, 1927.
A. P. WITHALL
1,627,367
SHOCK ABSORBING MECHANISM
Filed Nov. 14, 1925
6 Sheets-Sheet 5
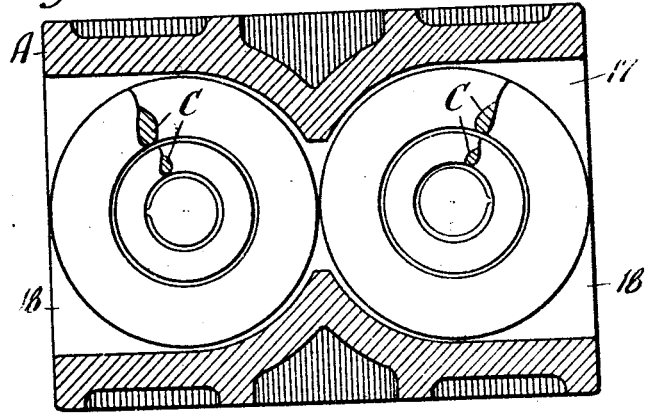
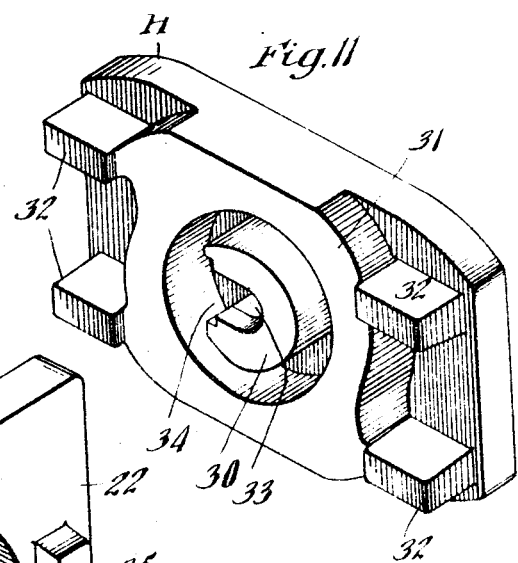
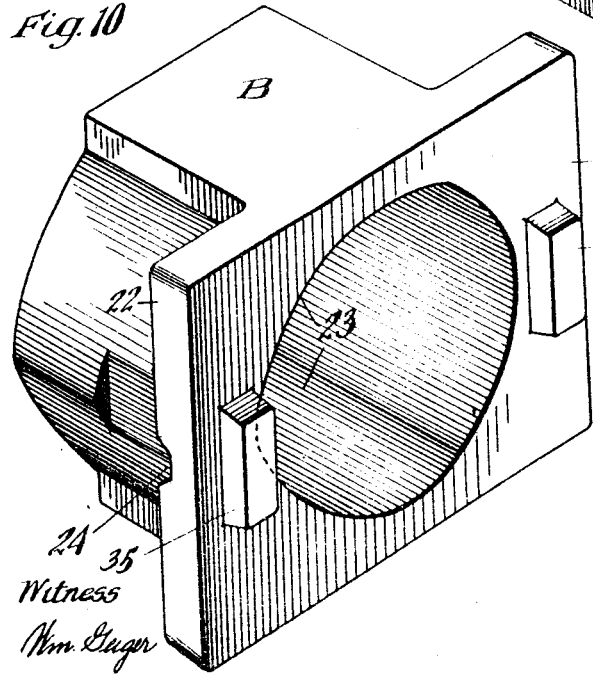
Witness
Wm. Gager
Inventor
Albert P. Withall
By George I. Haight
His Atty.

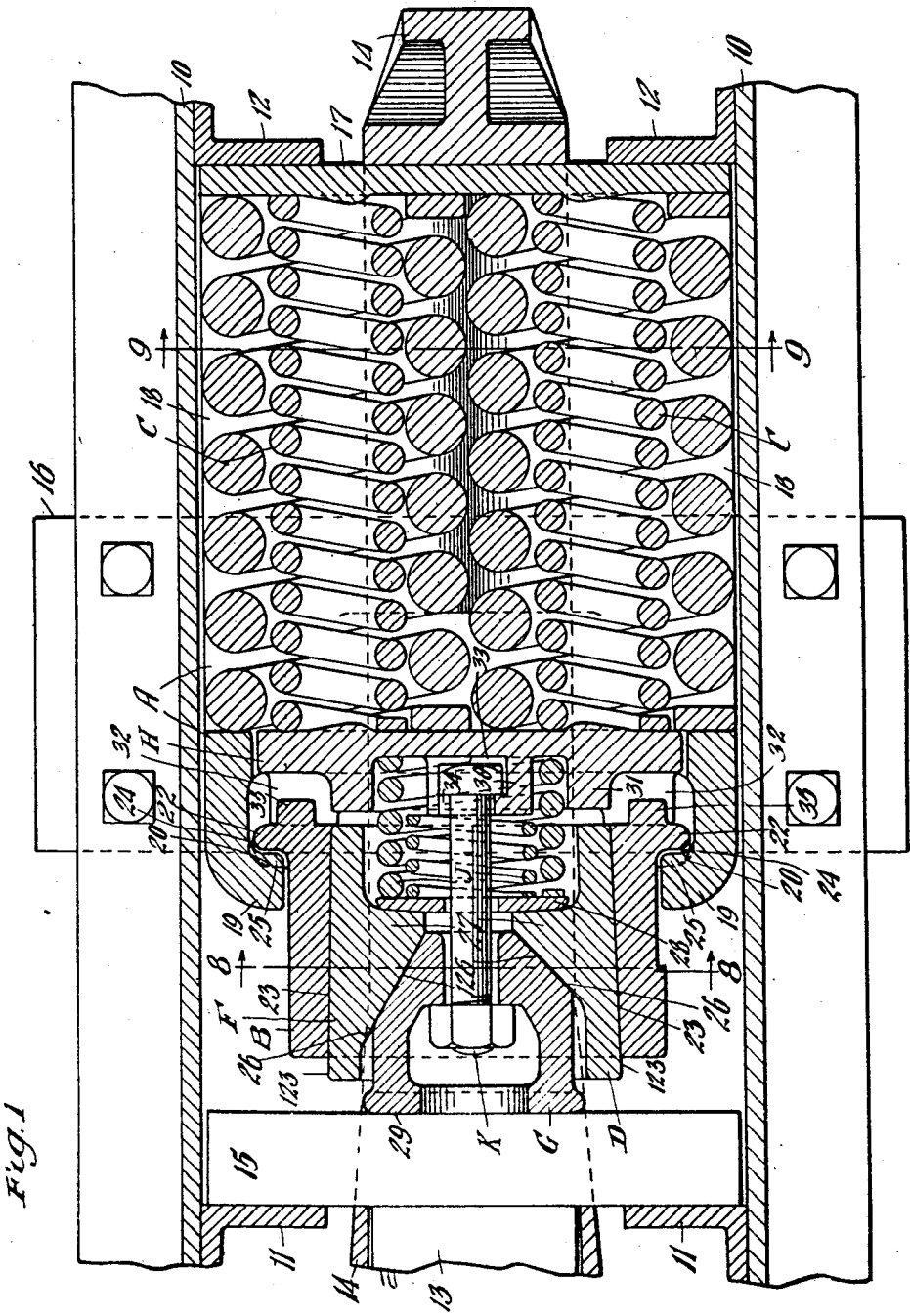

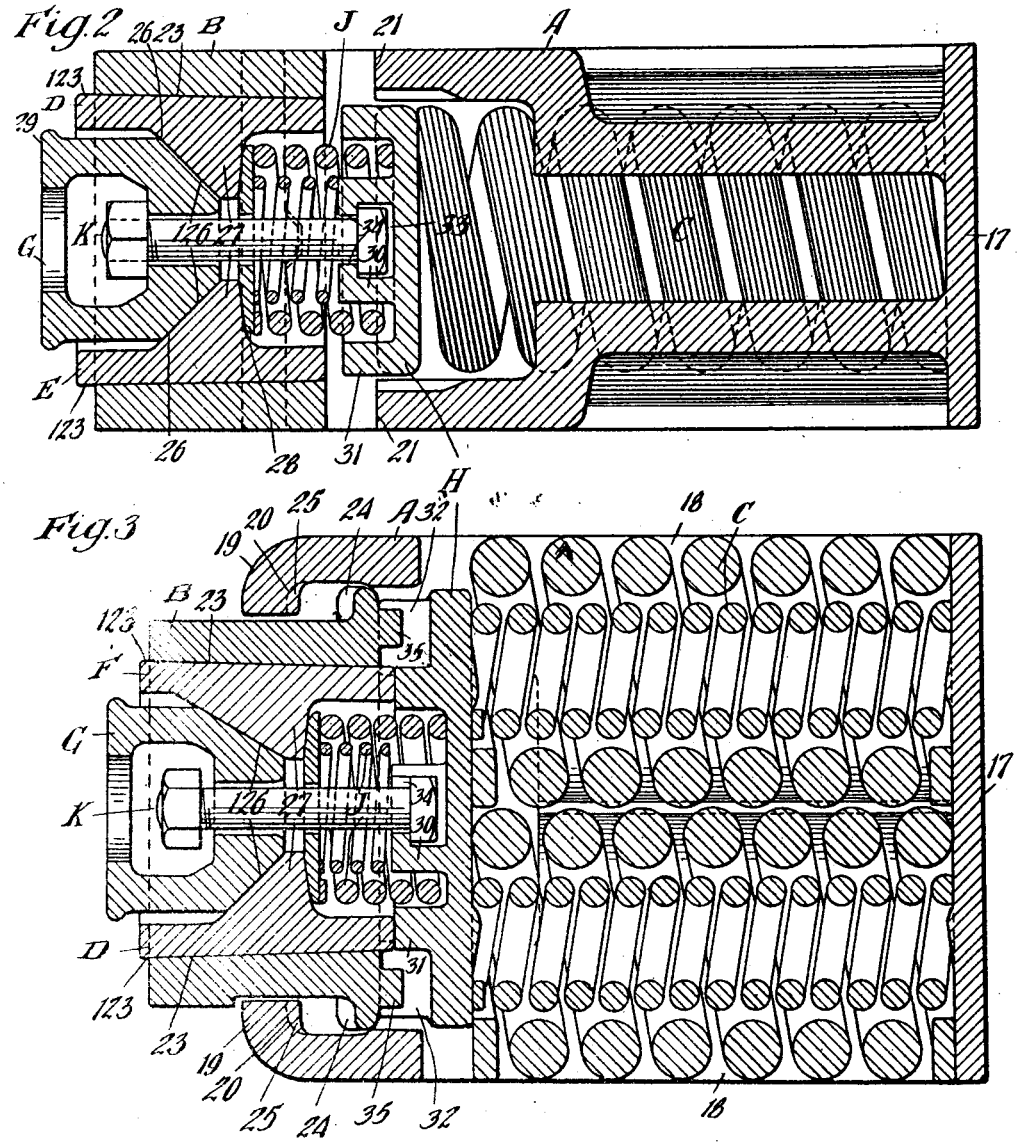

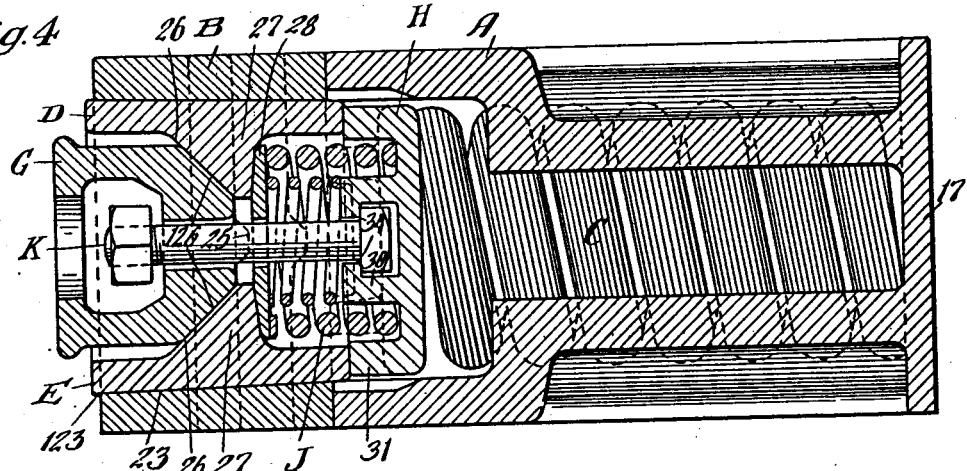
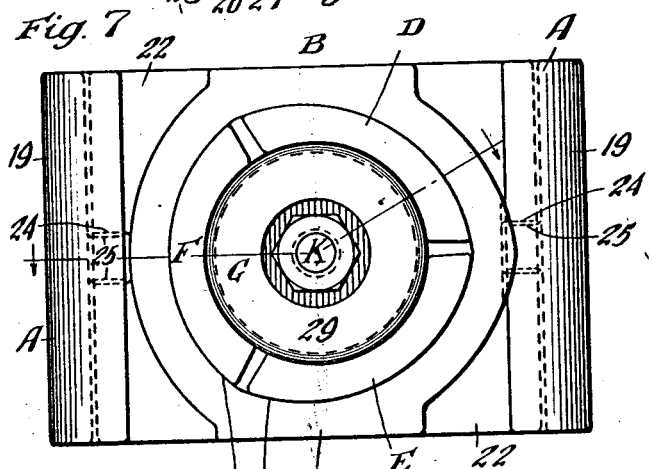
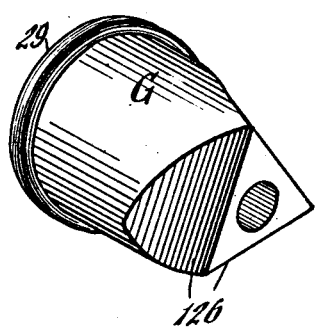
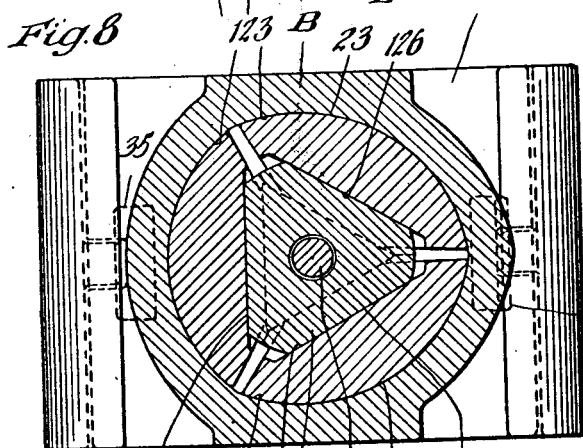
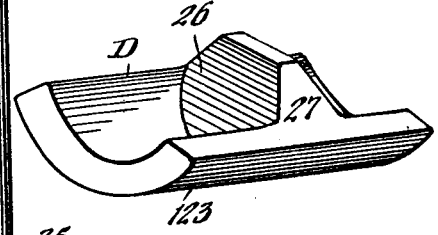

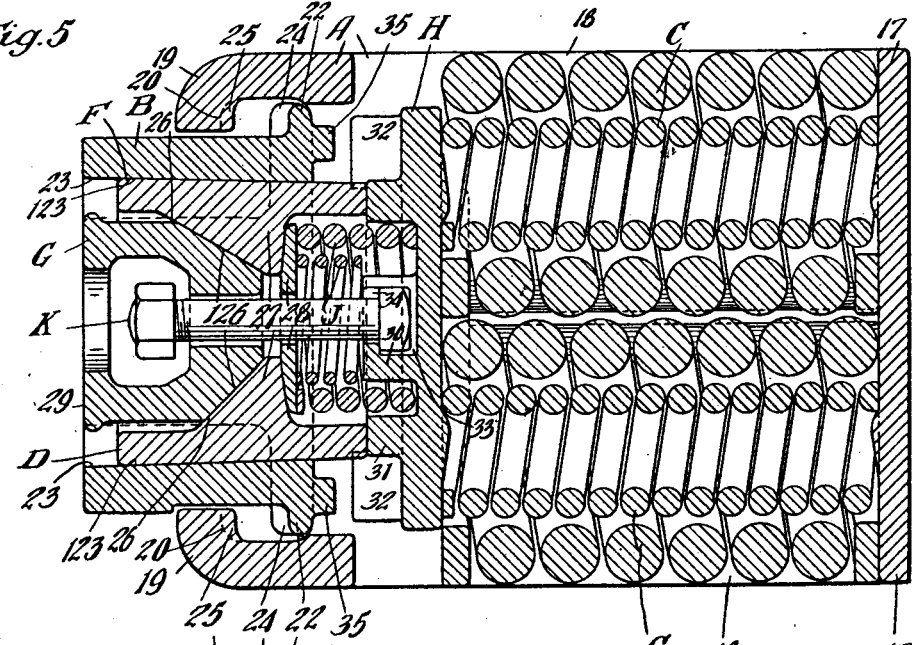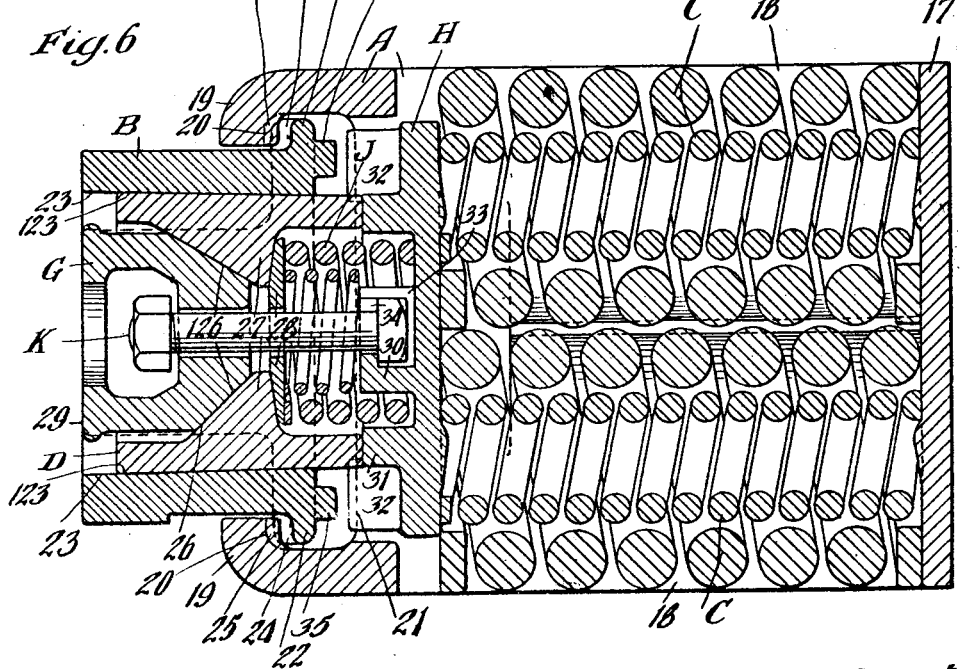

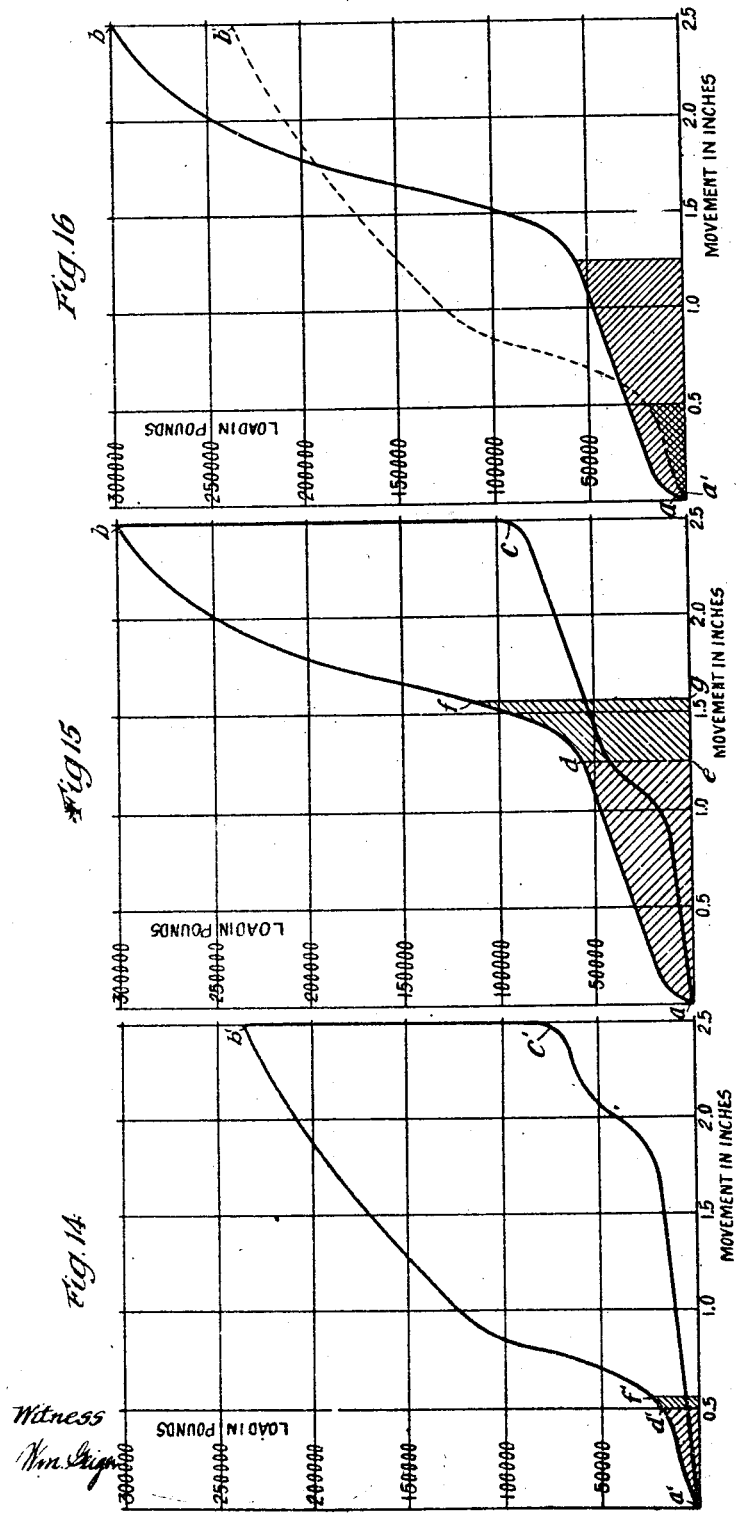

Patented May 3, 1927.

1,627,367

UNITED STATES PATENT OFFICE.

ALBERT P. WITHALL, OF CHICAGO, ILLINOIS, ASSIGNOR TO W. H. MINER, INC., OF CHICAGO, ILLINOIS, A CORPORATION OF DELAWARE.

SHOCK-ABSORBING MECHANISM.

Application filed November 14, 1925. Serial No. 68,987.

This invention relates to improvements in shock absorbing mechanisms, and, more particularly, shock absorbing mechanisms for railway draft riggings.

While my present improvements are adaptable for use with both freight and passenger equipment, they have been particularly designed for use on the locomotives and cars of modern passenger trains operated at relatively high speed and wherein a large number of passenger cars are used per train, and for this reason, the description hereinafter following will be directed more particularly to the problem of passenger train service.

To obtain a thorough understanding of certain peculiar conditions which have been encountered in modern passenger train service, it is advisable to outline in a brief way the developments which have taken place in draft gears and the characteristics of draft gears having the best available action prior to my invention as known to me. As is well known to those skilled in the art, the first type of draft gear was that of a single spring. The single spring type of gear was adequate for a short time until the size of cars and size of locomotives increased to the point where wood sub-structures for supporting the draft gears were insufficient and change was made to the steel underframe construction. Greater shock absorbing capacity in the draft gear was then demanded and was met by introducing two springs in gears of the type known as the twin spring and tandem spring gears. These gears, which provided a free spring action throughout the entire compression stroke proved adequate for many years, until ultimately, the gradual increase in size of individual cars, increase in number of cars per train, and increase in tractive effort of the locomotives became such that still greater ultimate shock absorbing capacity was required, the maximum available shock absorbing capacity of a tandem or twin spring gear having been limited to about 50,000 pounds.

The next change in the development of the art to meet the new conditions was the introduction of the friction gear which combined a number of friction elements with a spring resistance so as to produce a shock absorbing device having a much higher ultimate shock absorbing capacity than obtainable in a straight spring type of gear. The friction gears of the various well known types were improved from time to time with a gradual increase in shock absorbing capacity. However, new problems were encountered due, in large part, to the fact that the action of the air brakes on passenger trains was speeded up so that the brakes could be applied more rapidly and thereby bring a train to a stop more quickly and in a shorter distance, permitting speedier operation of trains. This factor produced greater disturbances in the draft gears and produced conditions that were not satisfactorily met by the friction gears developed up to this time. One new problem was that requiring easier starting of passenger trains without excessive shock or vibration being transmitted to the cars, causing discomfort to the passengers. The friction gear was relatively too stiff in action and presented too great a frictional capacity in the lower range of the compression stroke. Initially, this problem was solved by the introduction of a preliminary spring action in the form of a preliminary spring independent of other spring means in conjunction with the friction elements. Temporarily, this type of preliminary spring gear met the requirements of service, but again, as still further increased demands arose, it was found that this type of preliminary spring action friction gear was inadequate for the reason that the independent preliminary spring provided for only a relatively short stroke of limited capacity and the preliminary spring was constantly being utilized to its maximum capacity with consequent maximum fiber stresses in the spring and resulting short life in the preliminary spring. This condition resulted from the fact that the tractive effort of the locomotive under normal running conditions was such as to maintain the preliminary spring under its full permitted compression, and necessitating the friction part of the gear being in action even under normal running conditions.

The next and final advance prior to my improvements, speaking broadly, to obviate the high fiber stresses of the springs within the preliminary spring action range, was to utilize the main springs of the friction gear as preliminary springs for a short part of the stroke.

It has been found, however, with the present day requirements in passenger service, with still longer trains and higher-powered passenger locomotives, that there are two distinct problems that have not been heretofore solved so as to eliminate the discomfort of the passengers. As is well known, in standard passenger practice, the maximum tractive effort of modern passenger locomotives, it being understood that the maximum tractive effort of a locomotive is the tractive effort produced the instant before the power applied to the drivers becomes so great as to overcome the adhesion between the rails and drivers, causing the drivers to slip, under normal rail conditions, starting at zero, is approximately within a range of 40,000 to 60,000 pounds draw-bar pull, and the sustained tractive effort, under speed, varies approximately from 30,000 to about 50,000 pounds. In starting a train, therefore, such locomotives exhaust or use up all of the free or live spring action of any such gears as have heretofore been available having a preliminary free spring action and consequently the gears are actuated to a point somewhere within the friction range of such gears. As the locomotive acquires speed, the sustained tractive effort is such as to exceed the available free spring capacity of such prior gears, and, consequently, the gears between the locomotive and the cars rearwardly of the locomotive remain partially compressed somewhere in the friction range of the compression stroke. It is further well known that locomotives, particularly of certain types most commonly employed on the western railroads having long hauls over heavy grades, develop a very definitely perceivable pulsation. Consequently, where the sustained tractive effort is such as to keep the gears of the locomotive and forward cars of the train always partially compressed and within the friction range, there is no available free-spring action of such gears to cushion or compensate for the pulsations which are transmitted backwardly throughout the train from the locomotive and there is, therefore, set up in the cars of the train, pulsations corresponding to the pulsation imparted to the locomotive as above outlined. At certain critical speeds and draw-bar pulls of locomotives under the conditions mentioned, this pulsation or vibration transmitted to the passenger cars is extremely uncomfortable and disturbing to passengers and particularly is this true of those cars of the train immediately at the rear of the locomotive.

Notwithstanding the advances that have been made as indicated in the preceding paragraphs, there has still remained a very serious disadvantage in the operation of passenger trains. This disadvantage, resulting oftentimes in extreme discomfort to passengers under critical conditions of operation, is caused by continued pulsations imparted to the passenger cars, the pulsations being distinguished from the usual shocks such as encountered when starting or stopping a train. In other words, the practically continuous pulsations occurring as frequently as 180 per minute, particularly emphasized under certain critical running conditions, are present when the train is running under a substantially constant speed, or when accelerating after having started.

The cause of these pulsations is undoubtedly due to the lack of balance of the counter-weights and moving parts of the locomotive at certain speeds, that is, there may be one speed at which the locomotive will run with the parts reasonably balanced, but any variation above or below such critical speed produces the unbalanced effect that, in turn, causes the pulsation effect in the movements of the locomotive. Obviously, passenger locomotives have such a wide range of speed that the pulsation in effect from the lack of balance in such a wide range becomes extremely noticeable at different times and, unless such pulsations can be prevented from being transmitted to the car or cars rearwardly of the locomotive, the effect on the passengers is extremely annoying and discomforting to the passengers.

While the source of the difficulty referred to has been known for some time, the efforts heretofore made to overcome the pulsation effect in the operation of passenger trains, have proved unsuccessful. Certain types of relatively stiff action friction gears on passenger cars have performance characteristics as to render them practically unsuitable in any degree for this type of service. Some other types of friction gears have been found more efficient in that they are more sensitive in the setting up of the friction action, and particularly in release. The effort has, therefore, been directed heretofore, practically entirely toward producing greater and greater sensitiveness in the friction gear parts so as to obtain a quicker release in the hope that the pulsations from the locomotive would be accommodated by an instantaneous setting and instantaneous release of the friction parts. The greatest advances along these lines, so far as known to me, have been attained in those types of friction gears employing anti-friction devices between the wedge setting parts of the friction elements. However, the advances made along these lines have proved inadequate and all insufficient to eliminate pulsation effect, there being certain limitations from a mechanical standpoint preventing the making of the friction parts sensitive beyond a certain point. As will be appreciated, the wedge or gripping action must be set up instantaneously and, in reducing the friction between the wedging parts by anti-friction means, there is a gradual concentration of the pressure or stresses on very minute areas of contact which, if the wedge action is developed too keenly, results in imbedding of one part in another.

I have discovered, and herein lies one of the important features of my improvements, that regardless of the sensitiveness to which a friction gear may be developed, it cannot, within the mechanical limitations necessarily imposed on a device of this character, eliminate transmission of the extremely rapid pulsations from a locomotive rearwardly to cars in back thereof, since pulsations occur with such rapidity when the train is under speed as to prevent the alternate instantaneous setting up and instantaneous release of the friction grip between friction elements that would be necessary with the result that the friction mechanism remains practically set under certain conditions even though the gear may not be under a full compression stroke, or even a major portion of a compression stroke.

My discovery, stated broadly, is that a free, live and constantly available straight spring action of sufficient capacity to equal or exceed the sustained tractive effort of a locomotive under given conditions must always be available in order that the pulsation effect be prevented from transmission to the cars rearwardly of the locomotive. In other words, regardless of the per cent of total compression of the gear, and regardless of whether or not the friction unit, as such, may be set or in an active gripping condition, there must be available, sufficient free spring capacity operable independent of any release of the friction unit, as such, to compensate for any variations in the way of pulsations or change in drawbar pull, no matter how rapidly alternated, within the sustained tractive efforts of a locomotive under speed. As hereinbefore stated, modern passenger locomotives have a maximum tractive effort within a range of approximately 40,000 to 60,000 pounds drawbar full and a sustained tractive effort of approximately 30,000 to 50,000 pounds drawbar pull. It will be understood that 60,000 pounds is approximately the maximum drawbar pull a modern passenger locomotive is capable of exerting.

In carrying out my discovery, therefore, I have found that it is necessary to provide an always available free spring capacity which will at least equal or preferably exceed the sustained tractive effort of the locomotive under given conditions in order that the pulsations from the locomotive may be entirely prevented from being transmitted back to the cars in the rear of the locomotive.

Incidently, my improvements solve another problem that has been presented in modern passenger service that arises from the practice of certain railroads which requires the engineer, in stopping a train, to apply the brakes only on the cars rearwardly of the locomotive, and not to the driving wheels, to thereby save the tires of the locomotive drivers from excessive wear. In this method of operation, the locomotives, which are heavy, tend to run ahead free of the cars, and consequently, there is a stretching out or compression of the draft gears of several of the cars of the train rearwardly of the locomotive to such an extent as to compress the gears of those cars to points within the friction range of the compression strokes thereof and the train is brought to a stop with the gears in this condition. In starting a train, after stopping in the above manner, it has heretofore been necessary for the engineer to first back his locomotive and the cars of the train, until the gears have been released out of the friction range and restored to their normal or neutral condition before the locomotive can be started in a forward motion to accelerate the train. By providing an always available free spring capacity, equal to or in excess of the sustained tractive effort of the locomotive, and preferably at least equal to the maximum tractive effort of the locomotive, this backing up of the locomotive to start a train is rendered unnecessary with my improvements.

The condition of modern passenger train service referred to in the immediately preceding paragraphs are such as occur in the normal operation of the trains. However, as is well known, abnormal conditions of shock are bound to occur, due, for instance, to emergency application of the brakes which requires a shock absorbing capacity in the gears far in excess of any that is available in a straight spring gear. In the switching of cars, a cushioning capacity is necessary to take care of excessive shocks, and, furthermore, even in the starting of a long train the momentum acquired by the locomotive and cars immediately rearwardly thereof will be such that, before the last car or cars of the train are picked up and accelerated, the pull imposed upon the rear or rear cars will exceed any available capacity of a free spring gear that could be mounted in the limited space, and with the limited stroke allowed in practice. The available space, as known to those skilled in the art, is definitely prescribed as to width, height and length, and also the permissible length of the compression stroke is limited. In the carrying out of my invention, the same has been done with due regard to practical limitations of space and compression stroke, and furthermore, with full consideration for the necessity of eliminating any abrupt change in the shock absorbing capacity of the mechanism, particularly in the change from the free spring action to the friction action,— in other words, proper provision has been made for a smooth and easy transition from the free or live spring action into the friction action of the gear.

One object of my invention, therefore, is to provide a shock absorbing mechanism conforming to modern limitations of available space and stroke, particularly adapted for passenger train equipment wherein there is provided, in effect, a free spring gear permitting easy starting of a train and always available for absorbing any normal shocks and pulsations that may occur in the operation of the train, and combined therewith, a friction mechanism as an emergency shock absorbing device available to absorb excessive or abnormal shocks, with all the advantages of a high capacity free spring gear and all the advantages of a high capacity friction gear, and elimination of the disadvantages and limitations of both types.

More specifically, an object of my invention is to provide in a combined spring and friction shock absorbing mechanism, an instantaneously available free spring action at any point in a compression stroke of the mechanism which will equal or exceed any sustained tractive effort of a passenger locomotive under speed.

Still another object of my invention is to provide in a shock absorbing mechanism having the free spring capacity of the character outlined in the preceding paragraph, a reserve friction shock absorbing mechanism of high capacity, of such character that the ultimate frictional capacity of the mechanism may be obtained, when necessary, combined with a smooth and easy period of transition, the friction elements being so designed and coordinated with the spring resistance that they are available for the purpose indicated without imposing upon the friction elements any destructive, concentrated stresses or loads.

Other objects of my invention will more clearly appear from the description hereinafter following, considered in connection with the drawings and the subject matter of the appended claims.

In the drawings forming a part of this specification, Figure 1 is a horizontal, longitudinal, sectional view of a portion of a railway draft rigging, showing my improvements in connection therewith, illustrating the mechanism in full release, the section through the friction elements and shell corresponding to two sectional planes 120° apart. Figure 2 is a longitudinal, vertical, sectional view of the shock absorbing mechanism shown in Figure 1, the section through the friction shell and friction elements corresponding to two section planes 120° apart. Figure 3 is a view similar to Figure 1, illustrating the position of the elements of the shock absorbing mechanism with the main spring compressed to the extent of its free action and the compensating spring compressed to a predetermined limited extent. Figure 4 is a view similar to Figure 2, showing the gear compressed to the same extent as illustrated in Figure 3. Figure 5 is a view similar to Figure 3 showing the gear fully compressed. Figure 6 is a view similar to Figure 3 illustrating an instantaneous condition of the parts of the mechanism immediately after a heavy shock has been absorbed and the load has been decreased. Figure 7 is a front end, elevational view of the shock absorbing mechanism proper. Figure 8 is a transverse vertical, sectional view corresponding substantially to the line 8—8 of Figure 1. Figure 9 is a transverse vertical sectional view corresponding substantially to the line 9—9 of Figure 1. Figures 10 and 11 are detailed, perspective views respectively, of the friction shell and the main spring follower. Figures 12 and 13 are detailed, perspective views, respectively, of the wedge member and a friction shoe. Figure 14 shows an indicator diagram of the action of a typical passenger type shock absorbing mechanism with best performance characteristics, known to me prior to my invention. Figure 15 shows an indicator diagram illustrating the action of the improved shock absorbing mechanism herein shown and described. And Figure 16 is a combination of the two indicator diagrams of Figures 14 and 15 for the purpose of comparison.

In said drawings, 10—10 indicate channel-shaped center or draft sills of a railway car underframe, to the inner surfaces of which are secured front stop lugs 11—11 and rear stop lugs 12—12. The inner end of the drawbar is indicated at 13, to which is operatively connected a hooded yoke 14 of well-known form. Although I have herein illustrated a hooded yoke, it will be evident that a yoke having swiveled connection with the drawbar such as is commonly employed in passenger equipment or any other well known form of yoke and drawbar may be employed. The shock absorbing mechanism proper, as well as a main follower 15, is disposed within the yoke. The yoke and the parts therewithin are supported in operative position by a detachable saddle plate 16.

The specific embodiment of a friction shock absorbing mechanism, which I have chosen to illustrate my invention, comprises, broadly, the following broadly termed elements or parts, the specific details and characteristics and relations of which are hereinafter specifically set forth, to-wit: a spring cage A; a friction shell B; twin arranged main spring resistance elements C—C; a series of three friction shoes D, E and F; a main wedge G; a spring follower H; a compensating spring J; and a retainer bolt K.

The spring cage A is of generally rectangular form and has a transverse rear end wall 17 adapted to cooperate with the rear stop lugs 12 in the manner of the usual follower. The opposite sides of the casing are left open as indicated at 18—18 to permit the lateral insertion of the main spring resistance element C; At the forward end of the casing the side walls are flanged inwardly as indicated at 19—19, thereby providing vertically disposed inner shoulders 20—20. The top and bottom walls at the forward end of the casing are cut away as most clearly shown in Figures 2 and 3, thereby providing abutment faces 21 adapted to cooperate with the inner end of the friction shell B to act as limiting stops. The shoulders 20 present stops which limit the outward movement of the friction shell as hereinafter more specifically pointed out.

The friction shell B is in the form of a substantially cylindrical casting having opposed, laterally projecting flanges 22 at the rear end thereof, the flanges being adapted to cooperate with the shoulders 20 to limit the outward movement of the friction shell with reference to the casing A. The arrangement is such that the shell is insertible in a vertical direction between the shoulders 20 and the abutment faces 21 of the casing A, and the spacing of the shoulders 20 and the abutment faces 21 of the casing A, is designed so as to permit a predetermined motion between the shell and casing of the extent and to attain the functions and results hereinafter set forth. The interior of the shell B is provided with a series of independent, true cylindrical friction surfaces 23—23, the same being converged inwardly of the shell. At the forward side of each flange 22, is provided a horizontally disposed recess 24 adapted to cooperate with a rib 25 in the corresponding flange 19 of the casing A to prevent lateral displacement of the shell B with reference to the casing and hold the parts assembled when the mechanism is in the full released position illustrated in Figure 1.

The three friction shoes D, E and F are of similar design, except as hereinafter pointed out. Each shoe is formed with an outer true cylindrical friction surface 123 adapted to cooperate with the corresponding shell friction surface 23 and an inner, inclined face 26 of relatively large contact area, formed on the front side of a lateral enlargement 27 on the shoe. The faces 26 of the two shoes D and E extend at a relatively blunt and readily releasable angle with respect to the longitudinal axis of the mechanism and the face 26 of the shoe F extends at a relatively keen true wedging angle to said axis. The rear faces of the enlargements 27 of the shoes bear on a spring follower 28 in the form of a disk. The spring follower 28 in turn bears on the forward end of the compensating spring J.

The wedge G, as shown, is in the form of a cast block suitably cored, having a flat front face 29 adapted to bear directly on the front follower 15. At the inner end, the block G is provided with three, rearwardly converging faces 126—126, each of relatively large area, arranged around the axis of the mechanism. Two of the faces 126 co-act with the faces 26 of the two blunt angle shoes D and E and are correspondingly inclined thereto, whereas the remaining true wedge face 126 of the block is inclined to correspond with the wedge face 26 of the shoe F and adapted to cooperate therewith.

The main spring follower H is in the form of a relatively heavy, rectangular plate having a flat rear abutment face adapted to co-operate with the front ends of the main spring resistance element C. At the forward side, the follower H is provided with a central boss 30 and an annular flange 31 surrounding the boss and spaced therefrom so as to provide a pocket adapted to accommodate the rear end of the compensating spring resistance J. The follower H is also provided with four, spaced, forwardly projecting lugs 32—32 at the front side thereof, the lugs 32 being arranged in pairs at opposite sides of the follower. The front ends of the lugs engage the inner end of the friction shell during compression of the mechanism. The flat front side of the annular flange 31 is adapted to co-operate at certain times, with the inner ends of the friction shoes D, E and F. The central boss 30 is recessed as indicated at 33 to receive the head of the retainer bolt K, and is slotted as indicated at 34 to accommodate the shank of the bolt. As clearly shown in Figures 1 and 11, the recess 33 is open at one side to permit lateral insertion of the bolt head. The outer end of the bolt K is anchored to the wedge block G, the nut of the bolt being accommodated within a recess in the block. The retainer bolt K is adapted to maintain the mechanism of uniform overall length and hold the spring J under an initial compression as hereinafter described. The lugs 32 serve to retain the friction shell B against lateral displacement, the shell being provided with a pair of projections 35—35 at the inner end thereof adapted to engage between the corresponding pairs of lugs 32. As shown in Figures 1 and 2, the inner ends of the friction shoes D, E and F are normally spaced from the front face of the annular flange 31 of the spring follower H.

The twin arranged main spring resistance elements C are interposed between the spring follower H and the transverse end wall 17 of the spring cage A. Each member of the twin arranged springs comprises an inner, relatively light coil and an outer heavier coil.

After many extended experiments, I have found that a very efficient gear capable of accomplishing the results hereinbefore set forth in a structure having the elements arranged as hereinbefore described, is obtained by employing main springs having a total ultimate capacity of approximately 80,000 to 85,000 pounds and by allowing for a predetermined limited relative movement between the friction shoes and shell and a movement of the friction shell with respect to the spring cage of approximately 1¼ inches, or one-half of the total available compression stroke. With this arrangement and capacity of the parts, the available free spring capacity at the time the friction shell is stopped in its movement relative to the cage, is approximately 55,000 to 60,000 pounds, and while I am aware that the distance and capacity figures above given may be varied within reasonable limits to suit different conditions, the important consideration, is that there is left available a free spring capacity at least equal to, and preferably in excess of, any sustained tractive effort that may be encountered in the particular service in which the gear or shock absorbing mechanism is to be used.

Further, I impose upon the main springs C, an initial compression appreciably in excess of any initial compression that has ever heretofore been employed in any gear having free spring travel so far as known to me. This initial compression will exceed 5,000 pounds and preferably, will approximate 10,000 pounds, the main springs being made with the proper free height to provide for this initial compression capacity when the mechanism is adjusted to its proper overall length.

Also, I provide for a transition period in excess of that heretofore employed so far as known and preferably there is left a clearance of approximately ⅜ of an inch between the inner ends of the friction shoes and forwardly projecting flange of the main spring follower H so as to provide for approximately a ⅜ inch transition period from the free spring action into the friction action, the object and functions of which will be hereinafter described. The compensating spring J is a comparatively light capacity spring so designed that it may be compressed ⅜ of an inch beyond the normal initial compression under which it is placed when the gear is assembled without developing excessive fiber stresses, said spring functioning to automatically adjust the friction shoes and wedges compensating for wear on the surfaces and permitting proper adjustment of the parts in obtaining the overall length of the mechanism. In addition, it will be obvious that said spring J also functions, in conjunction with the friction shoes and friction shell proper as the spring of a friction mechanism for a limited time during the transition period in building up the resistance in the change from the straight spring action to the final full friction action of the mechanism.

With the foregoing described construction and capacities and predetermined relative movement of the parts in mind, the operation of my improved mechanism, assuming a compression stroke, may be described as follows. For convenience a compression stroke under buff will be assumed. As the front follower 15 moves rearwardly, the first resistance afforded will be that of free spring action arising from the compression of the two main springs or spring resistance unit J. This is due to the fact that the friction unit, comprising the friction shell and friction elements therewithin, moves bodily without any appreciable friction action. This preliminary free spring action is permitted for 1¼ inches so that there will be developed at the end of said period of action, a resilient capacity, of approximately 55,000 to 60,000 pounds capacity. By reference to the diagram shown in Figure 15, the compression line, starting at a, representing an initial compression of 10,000 pounds, follows the line a—d. In this connection, it will be understood that in the diagrams of Figures 14 and 16 as well as 15, the horizontal lines represent load in pounds and the vertical lines indicate movement in inches. The next action in the compression stroke, if the shock to be absorbed is great enough, is the transition from the true free spring action to the friction action, this being represented in the diagram on the pressure curve from d to f, wherein it will be noted that there is a smooth upwardly rising curve developing at the end of the ⅜ inches of transition, a capacity of approximately 90,000 to 95,000 pounds. In this connection, the the free spring action of the mechanism is represented by the shaded area a, d, e and the transition period by the differently shaded area d, f, g, e. The indicator diagram denotes a definite line of separation of the free spring action and the transition action, but in actual practice, there will probably be some slight overlapping of the transition action into the late part of the free spring action, depending upon the initial frictional resistance to relative movement between the shoes and the shell and the degree of initial compression in the compensating spring J, but for practical purposes, the action is substantially as indicated in the diagram of Figure 15. In this figure, the line $b$, $c$, $a$ represents the release action. In Figure 14, the release action is represented by the line $b'$, $c'$, $a'$.

Before proceeding further with the description of a compression stroke, it will be observed that there has been built up during the free spring action, a relatively high resistance, approximately 55,000 to 60,000 pounds, as aforesaid, and that this resistance is increased at a more rapid rate but without abrupt change, until approximately 90,000 to 95,000 pounds before the true friction of the mechanism for the last 7/8 inches of the compression stroke occurs. In other words, prior to the initiation of the true friction action of the mechanism, there is already developed, a very high resistance and consequently, the corresponding load on the friction elements is high in starting the true friction action. It is in this connection that the particular type of friction unit which I have provided, is important in that, by the use of the blunt and keen faces between the wedge and the shoes, I am enabled to employ a relatively acute, true wedging angle on the set of faces 26 and 126 of the shoe F and wedge without danger of the parts sticking when released, since the blunt sets of faces 26 and 126 of the shoes D and E and the wedge always assure release. Furthermore, as hereinbefore pointed out, large areas of contact are provided between the faces of the wedge and the faces of the friction shoes so that, although extremely heavy loads are applied to these parts and required to be absorbed quickly during a remaining comparatively short portion of the compression stroke, there will be no such concentration of pressure on any element as to upset any of the metal or cause imbedding of one part within another. During the last 7/8 inches of movement in the compression stroke, the action will be a true friction action and the compression curve will follow the line approximately indicated by $f$—$b$ in Figure 15 with an ultimate total capacity of the mechanism of approximately 300,000 pounds. (Under a full compression, the parts will assume the position shown in Figure 5.)

Referring now to Figure 6 of the drawing, wherein an instantaneous condition of the mechanism is illustrated as occurs immediately after the absorption of a heavy shock. In this figure, it will be observed that the shell B is moved outwardly a part of its possible travel but there has been thus far practically no relative movement between the friction shoes and the shell. Correspondingly, there has been a partial expansion of the main spring resistance unit, thereby providing a certain amount of free spring capacity prior to release of the friction elements. When the conditions are such that the applied force drops below that illustrated by the condition of the parts in Figure 6, the shell will continue to move outwardly until movement thereof is limited, whereupon the shoes will be forced outwardly with reference to the shell, the degree of relative movement between the shoes and the shell depending upon the amount of reduction of applied pressure. After a heavy blow has been absorbed, compressing the gear as illustrated for instance in Figure 5, and thereafter the load has dropped to a point below the maximum tractive effort of the locomotive, but with a sustained tractive effort still being imposed upon the mechanism, as when the train is running under speed, the conditions assumed by the parts will range within the limits of the condition illustrated in Figure 6 and a condition where outward movement of the shell has been arrested and the friction shoes and wedge and associated compensating spring J have moved outwardly a slight distance with respect to the friction shell B. It will be noted that under the condition illustrated in Figure 6, even though pulsations are being imparted to the locomotive, there is still available the free spring capacity of the main spring resistance unit to absorb or cushion such pulsations or oscillations, notwithstanding the fact that the friction unit proper has not completely released and is in a compressed condition. Furthermore, still referring to Figure 6, should the train be brought to a stop with the shock absorbing mechanism in condition as shown in Figure 6, there is available a free spring action which will readily permit the engineer to start the train without the necessity of backing up.

By employing blunt and keen faces on the wedge and shoes, they may be so related as to permit an easy blending or transition from the ultimate, high free spring capacity to the true friction action. With such friction elements, regardless of the keenness of the wedging angle which may be required, the area of contact will always be sufficiently great as to prevent concentrated destructive stresses in either the wedge or the shoes.

Referring now to the indicator diagrams in Figure 14 and 16. The diagram in Figure 14, corresponds to that of the best commercial spring friction gear heretofore available for passenger service, so far as known to me. In this type of mechanism, the initial compression is comparatively low and normally is under 5,000 pounds. The free spring action is available for only a half inch and consequently, the maximum free spring capacity available, represented by the line $a'\ d'$ is not in excess of 20,000 pounds. The transition period represented by the line $d'—f'$, in the best known practice heretofore, approximates an eighth of an inch, with a resulting maximum capacity at the end of the transition period of approximately only 25,000 pounds. The true friction action is represented by the line $f'—b'$. With such a mechanism, it is obvious that a locomotive exerting a sustained tractive effort of say 40,000 to 45,000 pounds, necessarily is imposing on the mechanism such a load as to compel the mechanism to pass into and remain within the true friction action range. Consequently, pulsations from the locomotive are transmitted to a stiff, rigid, non-yielding mechanism, since the friction parts never have opportunity to release; the free spring capacity is always exhausted; and the pulsations are insufficient to produce actuation of the friction unit as such. The differences in the action of the two mechanisms is best shown by the superimposed indicator diagrams of Figure 16, where the available free spring capacity of my improved mechanism is shown not only to far exceed that of the other prior known mechanism, but shows clearly the availability of the free spring action always within the sustained tractive effort of the locomotive and with the reserve friction action in cases of emergency for absorbing abnormal shocks.

Observations have shown that, in actual practice, over 95% of the shocks encountered in normal operations of passenger trains will fall under the maximum tractive effort of the locomotive. With my improvements, these are all absorbed by the free spring action which promote the life of the mechanism from two distinct angles. The first of these is due to the fact that such large percentage of shocks are taken solely by the main springs in the lower ranges of fi r stresses of the springs, that is, without compressing the springs up to their maximum permitted fiber stresses. This prevents fatigue of the springs and consequently prolongs the life thereof. The second factor is due to the fact that the friction unit proper is called upon for service only a very small percentage of the time and consequently there is eliminated the rapid constant back and forth movements of the shoes relative to the shell, which, even though they may be comparatively minute to absorb comparatively small shocks, are destructive of the friction surfaces and cause unnecessary rapid wear thereof. Hence, the life of the friction unit is materially prolonged.

I have herein illustrated one specific embodiment of my invention, and described with particularity certain features, capacities, and characteristics thereof. I am aware that various changes and modifications may be made, both in structure and in spring capacities, relative permitted movements of the parts and otherwise, without departing from the spirit of the invention. All such changes and modifications are contemplated as come within the scope of the claims appended hereto.

I claim:

1. In a shock absorbing mechanism, adapted for railway draft riggings, subject to a known sustained maximum drawbar pull from a locomotive, said mechanism comprising: a spring resistance unit; a friction unit comprised of a plurality of elements relatively movable when said friction unit, as such, is operated, said friction unit being bodily and inactively movable relative to the spring resistance unit for a predetermined initial portion of the compression stroke of the mechanism, and thereafter the parts of said friction unit relatively movable to create friction resistance, the available free spring capacity of said spring resistance unit while said friction unit as such is inactive, being in excess of said known sustained maximum draw-bar pull to thereby freely cushion all normal shocks and pulsations within the range of the said sustained maximum draw-bar pull, said spring resistance unit having an additional capacity available in co-operation with the friction unit during the actuation of the latter in absorbing shocks in excess of the said available free spring capacity of the spring resistance unit.

2. In a combined spring and friction shock absorbing mechanism adapted for draft riggings of standard passenger equipment subject to a sustained tractive force approximating the sustained maximum tractive effort of the locomotive of said standard equipment, the combination with a friction system having movement as a unit to a limited extent, said system including cooperating friction members having relative movement after the movement of said friction system as a unit is limited; of a cushioning spring means successively resisting movement of said friction system as a unit and relative movement of said members, whereby compression of said spring is effected in two successive stages, the capacity of resistance of said spring during the first stage being at least as great as the sustained maximum tractive effort applied to the gear in standard passenger practice.

3. In a combined spring and friction shock absorbing mechanism adapted for railway draft riggings subject to a tractive force approximating the maximum tractive effort of a standard passenger locomotive, the combination with a friction system including cooperating relatively movable friction elements; of a spring cage, said cage and one of said elements having limited relative movement; wedge pressure transmitting means for forcing said elements into intimate frictional contact; a cushioning spring element within the spring cage adapted to resist movement of said friction system, the elements of said friction system being bodily movable as a unit until said element having the limited movement is arrested to transmit the actuating force directly to the cushioning spring, thereby compressing the latter to a predetermined extent, said friction elements being forced to move relatively to each other upon said element having limited movement being arrested, and further compression of the mechanism, effecting still further compression of the spring to absorb abnormal shocks, the total capacity of said spring during said predetermined amount of compression being at least as great as the sustained maximum tractive effort applied to the gear in standard passenger practice.

4. In a shock absorbing mechanism adapted for railway draft riggings subject to a tractive force approximating the maximum tractive effort of a standard passenger locomotive, the combination with a spring casing; of a friction member having limited movement with respect to the casing, the extent of movement approximating half of the compression stroke of the mechanism; friction elements cooperable with said member; spring means disposed within the casing and resisting relative movement of said member and casing and further resisting relative movement of said friction elements and member after relative movement of the casing and member is limited, the total capacity of said spring during said limited movement of the friction member being at least as great as the sustained maximum tractive effort applied to the gear in standard passenger practice.

5. In a shock absorbing mechanism, the combination with a spring cage; of a friction shell, said shell and cage having limited relative movement; friction elements cooperating with said shell and having movement relative thereto; means for effecting movement of said friction elements and forcing the same into intimate contact with the shell; and a main spring resistance opposing relative movement of the shell and cage and opposing relative movement of the friction elements and shell successively, said main spring resistance being of at least 75,000 pounds capacity.

6. In a shock absorbing mechanism adapted for railway draft riggings subject to a tractive force approximating the maximum tractive effort of a standard passenger locomotive, the combination with a spring cage; of a friction shell, said shell and cage having limited relative movement of at least one inch; friction means cooperating with the shell and having movement relative thereto, said friction means including lateral pressure creating means, and a main spring resistance opposing relative movement of said shell and cage and relative movement of said friction elements and shell successively, the total capacity of said main spring resistance at one inch of compression being at least as great as the sustained maximum tractive effort applied to the gear in standard passenger practice and exceeding 30,000 pounds.

7. In a shock absorbing mechanism adapted for railway draft riggings subject to a tractive force approximating the maximum tractive effort of a standard passenger locomotive, the combination with a column element; of friction means including a friction member and cooperating friction elements, said member and column element having relative movement to a predetermined extent; a spring resisting relative movement of said column element and member to provide free spring action and also resisting relative movement of said member and friction elements to provide ultimate high capacity, the free spring resistance of the mechanism being in excess of the maximum sustained tractive effort of a standard locomotive.

8. In a friction shock absorbing mechanism, the combination with a spring cage; of a friction shell, said cage and shell being relatively movable to a limited extent; a friction system cooperating with the shell; a spring resistance within the cage; and a spring follower interposed between the shell and spring, said follower and shell having interengaging lugs to prevent relative lateral displacement of the shell and follower.

9. In a friction shock absorbing mechanism, the combination with a casing open at one end thereof; of a friction shell disposed at said open end of the casing; cooperating shoulders on the shell and casing adapting the shell for a limited amount of movement with respect to the casing; friction elements cooperating with the shell; spring means disposed within the casing; a follower cooperating with the spring means adjacent the end of the shell, said follower having abutment means thereon engaging the end of the shell; and means on the shell cooperating with the follower abutment means for preventing accidental disengagement of said shell and casing.

10. In a shock absorbing mechanism adapted for railway draft riggings, subject to a tractive force approximating the maximum tractive effort of a standard passenger locomotive and having, when subjected to a force equal to said tractive force, a normal compression stroke less than the full compression stroke of the same, the combination with a spring cage and a friction system, said system including a plurality of movable elements, said elements composing said friction system, being bodily movable in unison with respect to the spring cage to a limited extent equal to the normal compression stroke of the mechanism; of means for limiting movement of one of said elements of the friction system after the mechanism has been compressed to said limited extent, whereby said friction elements are compelled to move relatively upon further compression of the mechanism beyond said normal compression stroke; and a spring resistance opposing bodily movement of said friction system and relative movement of the elements thereof, the capacity of said spring resistance while opposing relative movement of said friction system and cage to said limited extent being such as to absorb all normal shocks to which the gear is subjected, whereby the remaining capacity of said spring is available to oppose relative movement of said friction elements to absorb abnormally heavy shocks.

11. In a friction shock absorbing mechanism adapted for railway draft riggings, subject to a tractive force approximating the maximum tractive effort of a standard passenger locomotive and having, when subjected to a force equal to said tractive force, a normal compression stroke less than the full compression stroke of the same, the combination with a spring cage; of a friction shell, said shell and cage being relatively movable to an extent less than the full and equal to the normal compression stroke of the mechanism; a friction system cooperating with the shell, said system and shell being relatively movable during the remainder of the compression stroke to absorb excessively heavy abnormal shocks; and spring means opposing relative movement of said shell and cage to the extent of said normal stroke, and opposing relative movement of the friction system and shell when said gear is compressed to an extent exceeding said normal stroke.

12. In a friction shock absorbing mechanism, the combination with a spring cage; of a friction shell, said shell and cage having limited relative movement; a spring resistance within said cage; spring follower means interposed between the shell and spring resistance, said spring follower means bearing on the inner end of the shell; a friction wedge system cooperating with the shell; and auxiliary spring resistance means interposed between said system and spring follower means.

13. In a friction shock absorbing mechanism, the combination with a pressure transmitting member; of a spring cage, said member and cage being relatively movable; a friction shell, said shell and cage having limited relative movement; friction shoes co-operating with the shell; a wedge co-operating with the shoes; a main spring resistance opposing relative movement of said shell and spring cage, and also opposing relative movement of said shell and shoes after a predetermined relative movement of said shell and shoes; and an auxiliary spring resistance opposing relative movement of said shell and shoes independently of the main spring resistance.

14. In a friction shock absorbing mechanism, the combination with a friction shell provided with friction surfaces; of friction shoes cooperating with the shell, said shoes being relatively movable to the shell; means for forcing said shoes against said shell surfaces and inwardly of the mechanism; a spring cage, said shell and cage having relative movement to a limited extent; a main spring resistance within the cage; an auxiliary spring resistance opposing relative movement of said shoes and shell; means including a spring follower for limiting the relative movement of said shoes and shell opposed by said auxiliary spring resistance and thereafter transferring the actuating force from said shoes directly to the main spring resistance, said spring follower also directly transmitting the actuating force from the shell to the main spring resistance during relative movement of said shell and cage.

15. In a friction shock absorbing mechanism, the combination with a friction member; of a spring supporting column element, said member and element having limited relative movement; a main spring resistance supported by said element, said spring resistance opposing relative movement of the member and element to provide for free spring action of the mechanism; movable friction means co-operating with said member, relative movement of said means and member being opposed by said main spring to provide heavy frictional resistance subsequently to said free spring action; and an auxiliary spring resistance opposing relative movement of said member and means independently of said main spring resistance to provide for a transition period of light frictional resistance.

16. In a friction shock absorbing mechanism, the combination with a friction member provided with friction surfaces; of friction shoes co-operating with the friction surfaces of said member, said shoes being relatively movable to said member; means for forcing said shoes against the surfaces of said member and inwardly of the mechanism; a spring carrying column element, said member and element having relative movement to a limited extent; a main spring resistance carried by said element; an auxiliary spring resistance opposing relative movement of said shoes and member; means including a spring follower for limiting the relative movement of said shoes and member opposed by said auxiliary spring resistance and thereafter transferring the actuating force from said shoes directly to the main spring resistance, said spring follower also directly transmitting the actuating force from said member to the main spring resistance during relative movement of said member and element.

In witness that I claim the foregoing I have hereunto subscribed my name this 31st day of October 1925.

ALBERT P. WITHALL.